(12) United States Patent
Ashmore et al.

(10) Patent No.: US 7,539,799 B2
(45) Date of Patent: May 26, 2009

(54) METHOD AND APPARATUS FOR IDENTIFYING ENCLOSURES AND DEVICES

(75) Inventors: Paul Andrew Ashmore, Longmont, CO (US); Ian Robert Davies, Longmont, CO (US); George Alexander Kalwitz, Mead, CO (US)

(73) Assignee: Dot Hill Systems Corp., Carlsbad, CA (US)

( * ) Notice: Subject to any disclaimer, the term of this patent is extended or adjusted under 35 U.S.C. 154(b) by 149 days.

(21) Appl. No.: 11/672,710

(22) Filed: Feb. 8, 2007

(65) Prior Publication Data

US 2008/0195581 A1 Aug. 14, 2008

(51) Int. Cl.
G06F 3/00 (2006.01)
G06F 13/12 (2006.01)
G06F 13/38 (2006.01)
G06F 15/173 (2006.01)
G06F 13/00 (2006.01)
G06F 13/28 (2006.01)

(52) U.S. Cl. .......................... 710/74; 710/8; 709/224; 711/114

(58) Field of Classification Search ............. 710/8, 710/74; 709/224; 711/114
See application file for complete search history.

(56) References Cited

U.S. PATENT DOCUMENTS

| 5,790,782 | A | * | 8/1998 | Martinez et al. ............. 714/53 |
|---|---|---|---|---|
| 6,366,965 | B1 | | 4/2002 | Binford et al. ................. 710/8 |
| 6,557,049 | B1 | * | 4/2003 | Maloy et al. .................... 710/8 |
| 6,697,875 | B1 | | 2/2004 | Wilson ........................ 709/254 |
| 6,751,693 | B1 | * | 6/2004 | Monia et al. ................. 710/104 |
| 6,754,728 | B1 | | 6/2004 | Yardumian et al. ............. 710/9 |
| 6,816,915 | B1 | * | 11/2004 | Packer ........................... 710/2 |
| 6,961,767 | B2 | | 11/2005 | Coffey et al. ............... 709/224 |
| 2003/0195953 | A1 | * | 10/2003 | Suzuki et al. ............... 709/220 |
| 2004/0139241 | A1 | * | 7/2004 | Shikada ........................ 710/3 |
| 2004/0190545 | A1 | | 9/2004 | Reid et al. ................... 370/451 |
| 2006/0020711 | A1 | * | 1/2006 | Nguyen et al. .............. 709/238 |

OTHER PUBLICATIONS

Examiner Blaine R. Copenheaver, International Search Report for corresponding Application No. PCT/US2008/052917, U.S. Search Authority; mailing date Jul. 7, 2008.

* cited by examiner

*Primary Examiner*—Henry W. H. Tsai
*Assistant Examiner*—Tushar S Shah
(74) *Attorney, Agent, or Firm*—Sheridan Ross P.C.

(57) ABSTRACT

A method, device, and system are provided for the automatically assigning identification numbers or enclosure IDs to enclosures in a data storage system. Each enclosure is assigned a unique enclosure ID that can be used to reference the enclosure in the data storage system. The enclosure IDs are generated and assigned to enclosures based on the network topology. Specifically, each enclosure is assigned an enclosure ID that not only uniquely identifies the enclosure but the enclosure ID can be used to determine the location of the enclosure in the data storage system.

20 Claims, 12 Drawing Sheets

METHOD AND APPARATUS FOR IDENTIFYING ENCLOSURES AND DEVICES

FIELD

The present invention is directed to data storage management. In particular, the present invention is directed to methods and apparatuses for addressing and identifying enclosures and storage devices within the enclosures.

BACKGROUND

The need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In today's storage world, many data storage systems are based on either Fibre Channel (FC) or Serial Attached SCSI (SAS) interfaces to disk enclosures. Fibre Channel disk enclosures are typically based on Arbitrated Loop (FC-AL) and optionally include Fibre Channel Loop Switches. In either case, the FC-AL addressing scheme usually dictates enclosure identification. Soft FC addressing is convenient, but is considered too loose for most system administrators. Hard FC addressing is less convenient to configure, but is easier to manage, especially in larger configurations. In many cases, the user must configure an enclosure's hard FC address-range through the use of a thumb-wheel or other mechanical interface. The thumb-wheel identifies the enclosure (via its mechanical display), and controls the FC addresses of the disks and SCSI Enclosure Services (SES) target within that enclosure. Since users use mechanical switches to assign IDs, two or more enclosures may end up with the same enclosure ID. One or more enclosures will then have to be assigned a different ID automatically. Additionally, there is no easy way to show a user which enclosures have duplicate IDs.

The SAS standard is quite different with respect to device addressing. Specifically, all SAS devices are addressed via their 64-bit World Wide Name (WWN). There is no equivalent in SAS to the simple scalar (0, 1, 2, . . . , n) used by FC or parallel SCSI to address drives. The WWN can hardly be considered user friendly for device identification. Since the WWN is used, there is no need for a thumb-wheel, or equivalent mechanical interface. Moreover, providing the user with one is artificial and could be misleading to the user trying to find the SAS device. Mechanical thumb-wheel switches could be used in SAS, but possible duplicates would still have to be handled. For both FC and SAS it seems that there is still a need for a method of identifying enclosures and devices contained therein.

SUMMARY

The present invention is directed to solving these and other problems and disadvantages of the prior art. In accordance with embodiments of the present invention, a mechanism for automatically numbering enclosures in a logical and useful fashion is provided. The method generally includes the steps of identifying a topology of enclosures within the storage system. After the topology of the enclosures has been determined, unique enclosure identifiers (IDs) are generated and assigned to enclosures in the storage system based on the topology of enclosures within the storage system. By assigning each enclosure an ID based on the topology of the storage system, a system administrator can easily locate an enclosure if the enclosure ID of that enclosure is known. In further embodiments, storage devices within an enclosure are assigned a device ID based in part, on the enclosure in which they reside.

In one embodiment, the enclosures in the storage system are also provided with a display device also referred to herein as an Enclosure ID Display (EID). The EID provides a visual indication of the enclosure ID assigned to the enclosure. The display device is useful in that when a system administrator is physically searching for a particular enclosure he/she can identify the enclosure as it was identified on the management console. This decreases the amount of time required to locate an enclosure, and the storage device contained therein, which may ultimately correspond to quicker storage device replacement and treatment times. Moreover, the EID is capable of automatically changing to reflect any changes to the enclosure ID making it user independent.

In accordance with one embodiment of the present invention, a data storage system is provided. The data storage system generally includes two or more enclosures, each of which contains at least one storage device. In one embodiment, each enclosure in the storage system is assigned an enclosure ID based on the enclosure's position in the cabling order. The storage devices within each enclosure are assigned storage device IDs corresponding to the enclosure they are stored in as well as their location within that enclosure. Accordingly, the unique storage device ID reflects the storage device's position within an enclosure as well as relative to other enclosures.

Additional features and advantages of embodiments of the present invention will become more readily apparent from the following description, particularly when taken together with the accompanying drawings.

DETAILED DESCRIPTION

Figure 1:
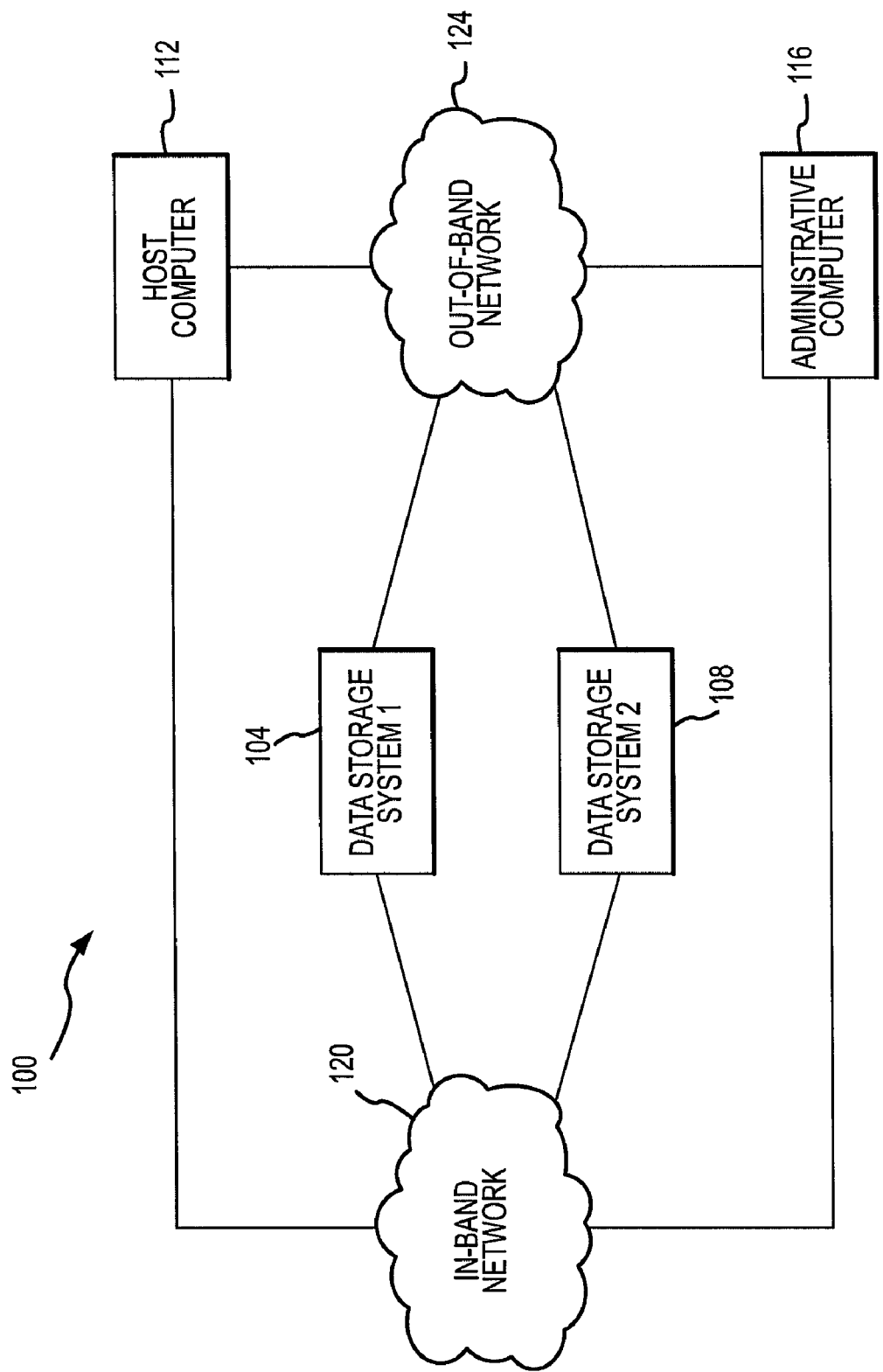
FIG. 1 is a functional block diagram depicting components of an electronic data system incorporating at least one data storage system in accordance with embodiments of the present invention.

FIG. 1 is a block diagram depicting an electronic data system 100 in accordance with embodiments of the present invention incorporating a first data storage system 104 and a second data storage system 108. The electronic data system 100 may also include one or more host processors, computers or computer systems 112. In addition, the electronic data system 100 may include or may be interconnected to an administrative computer 116. As will be appreciated by one of skill in the art after consideration of the present disclosure, embodiments of the present invention have application in association with single or multiple hosts 112 in storage area network (SAN) or direct connect environments.

The data storage systems 104, 108 are typically interconnected to one another through an in-band network 120. The in-band network 120 may also interconnect the data storage systems 104, 108 to a host computer 112 and/or an administrative computer 116. The electronic data system 100 may also include an out-of-band network 124 interconnecting some or all of the electronic data system 100 nodes 104, 108, 112 and/or 116. For instance, an in-band network 120 comprising a Fibre Channel or a TCP/IP network may connect a first data storage system 104 to a second data storage system 108 across some distance, and each of these data storage systems 104, 108 may be connected to one or more host computers 112 through an in-band 120 and/or an out-of-band 124 network.

The in-band or storage area network 120 generally functions to transport data between data storage systems 104 and/or 108 and host devices 112, and can be any data pipe capable of supporting multiple initiators and targets. Accordingly, examples of in-band networks 120 include Fibre Channel (FC), iSCSI, parallel SCSI, SAS, Infini-Band, Ethernet, ESCON, or FICON connections or networks, which may typically be characterized by an ability to transfer relatively large amounts of data at medium to high bandwidths. The out-of-band network 124 generally functions to support the transfer of communications and/or commands between various network nodes, such as data storage resource systems 104, 108, host computer 112, and/or administrative computers 116, although such data may also be transferred over the in-band communication network 120. Examples of an out-of-band communication network 124 include a local area network (LAN) or other transmission control protocol/Internet protocol (TCP/IP) network. In general, the out-of-band communication network 124 is characterized by an ability to interconnect disparate nodes or other devices through uniform user interfaces, such as a web browser. Furthermore, the out-of-band communication network 124 may provide the potential for globally or other widely distributed management of data storage systems 104, 108 via TCP/IP.

Every electronic data system node or computer 104, 108, 112 and 116, need not be interconnected to every other node or device through both the in-band network 120 and the out-of-band network 124. For example, no host computer 112 needs to be interconnected to any other host computer 112, data storage system 104, 108, or administrative computer 116 through the out-of-band communication network 124, although interconnections between a host computer 112 and other devices 104, 108, 116 through the out-of-band communication network 124 are not prohibited. As another example, an administrative computer 116 may be interconnected to at least one storage system 104 or 108 through the out-of-band communication network 124. An administrative computer 116 may also be interconnected to the in-band network 120 directly, although such an interconnection is not required. For example, instead of a direct connection, an administrator computer 116 may communicate with a controller of a data storage system 104, 108 using the in-band network 120.

In general, a host computer 112 exchanges data with one or more of the data storage systems 104, 108 in connection with the performance of the execution of application programming, whether that application programming concerns data management or otherwise. Furthermore, an electronic data system 100 may include multiple host computers 112. An administrative computer 116 may provide a user interface for controlling aspects of the operation of the storage systems 104, 108. The administrative computer 116 may be interconnected to the storage system 104, 108 directly, and/or through a bus or network 120 and/or 124. In accordance with still other embodiments of the present invention, an administrative computer 116 may be integrated with a host computer 112. In addition, multiple administrative computers 116 may be provided as part of the electronic data system 100. Furthermore, although only two data storage systems 104, 108 are shown in FIG. 1, an electronic data system 100 may include more than two data storage systems. Alternatively, an electronic data system 100 may only include one data storage system.

Figure 2:
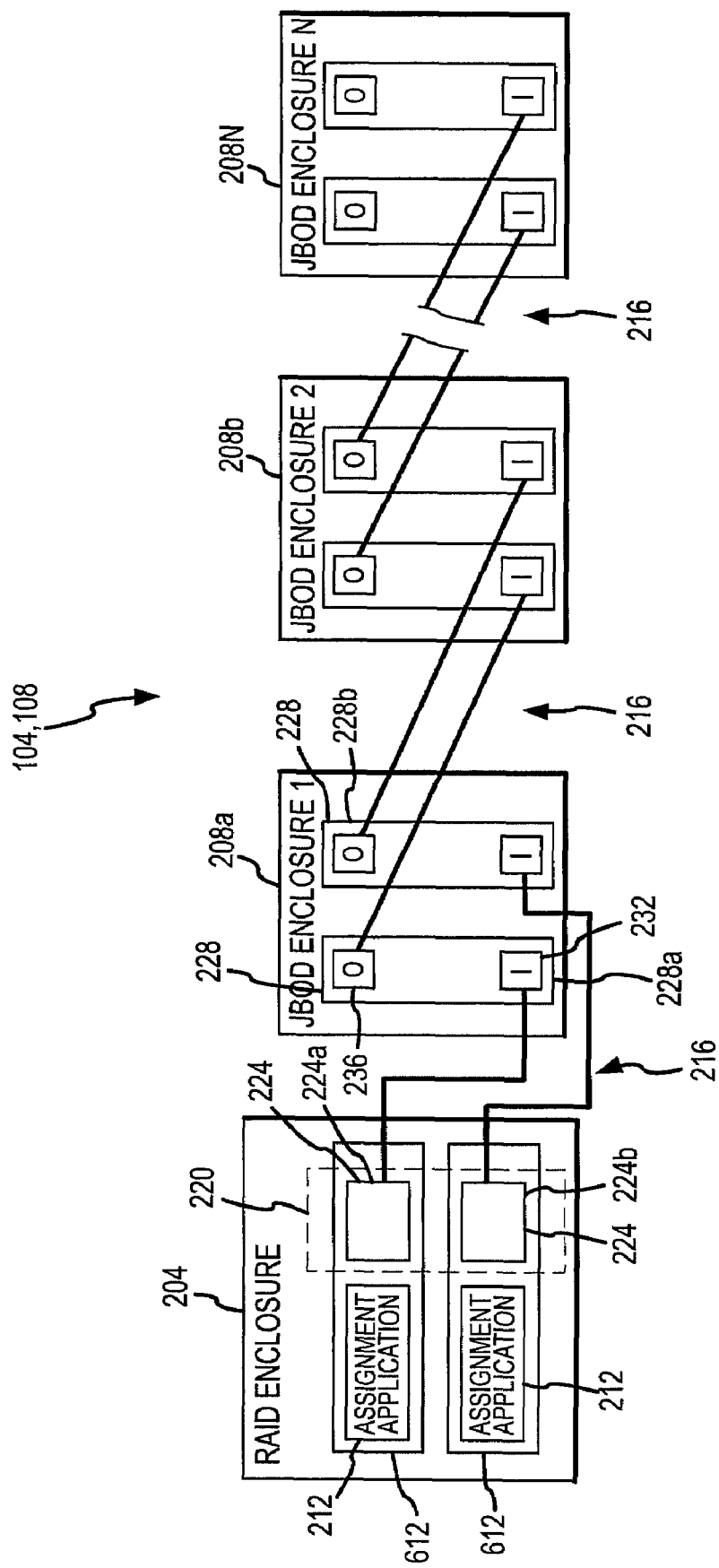
FIG. 2 is a block diagram depicting a data storage system having a RAID enclosure as the head enclosure in accordance with embodiments of the present invention.

A data storage system 104, 108 may comprise multiple enclosures, each of which contain one or more storage devices. For example, FIG. 2 depicts a data storage system 104, 108 having a RAID enclosure 204 as the head enclosure in accordance with at least some embodiments of the present invention. The RAID enclosure 204 is connected to a number of additional JBOD enclosures 208*a*-N through expansion cabling 216. The order in which the JBOD enclosures 208 are arranged relative a controller 612 in the head RAID enclosure 204 is also referred to herein as the cabling order or data storage system topology. In one embodiment, the first JBOD enclosure 208*a* connected directly to the head RAID enclosure 204 is first in the cabling order. It follows that the second JBOD enclosure 208*b* connected directly to the first JBOD enclosure 208*a* is second in the cabling order. The determination of cabling order continues in a similar fashion until the Nth JBOD enclosure 208N is reached. However, it can be appreciated that the reverse cabling order may define the ordering of JBOD enclosures 208*a*-N. For example, the Nth JBOD enclosure 208N may be considered first in the cabling order and the first JBOD enclosure 208a may be considered last in the cabling order.

The cabling order of the enclosures 204, 208 may be defined by the order in which a particular controller within the RAID enclosure 204 sees expanders 228 in the JBOD enclosures 208a-N. Alternatively, the cabling order may be defined by the reverse order in which a controller sees the expanders 228 in the JBOD enclosures 208a-N. Reverse cable ordering is provided to create a fault-tolerant SAS cabling scheme. In other words, the determination of enclosure IDs are made by two different cable orders, where one is ordered in the reverse of the other. Therefore, if one controller fails, the other controller is still able to identify the enclosure IDs using its own knowledge of the enclosure Ids. Each controller 612 may employ an assignment application 212 to independently determine the cabling order. In accordance with one embodiment, one controller 612 defines the cabling order in the forward direction from which it "views" enclosures 208 while the other controller 612 defines the cabling order in the reverse direction from which it "views" the enclosures 208. Since the first enclosure 608 seen by one controller 612 corresponds to the last enclosure 208 seen by the other enclosure 208, each enclosure is independently identified with the same enclosure ID by each assignment application 212. This provides a consistent numbering system to users regardless of controller 612 is queried for an enclosure ID. This further provides a fault-tolerant cabling, in which there are essentially two different cable orders in use. As an example, the assignment application 212 may assign the head RAID enclosure 204 an enclosure ID of zero.

Each RAID enclosure 204 in the data system 100 may contain at least two I/O module electronics boards each with one or more expansion ports or expanders 224, for example. In particular, the RAID enclosures 204 may contain two RAID I/O modules respectively. The two modules are used to provide fault tolerance in the event of a failure. As can be appreciated by one of skill in the art, an assignment application 212 may be provided in each module where each I/O module is associated with a different controller 612 respectively. The RAID enclosure 204 may include an expansion channel 220 that includes one or more expansion ports or expanders 224, each associated with a different controller 612. More specifically, a first expansion port 224a may be associated with a first controller 612 while a second expansion port 224b may be associated with a second controller 612. Both expanders 224, however, share a common expansion channel 220.

Expanders 224 are a building block chip that acts like a switching device thereby providing the ability to connect various enclosures together into a storage system 104, 108. Expanders generally contain two or more external expander ports 424. Each expander contains at least one target port for management. For example, an expander may include a Serial SCSI Protocol target port for access to a peripheral device.

The JBOD enclosures 208a-N may also include expansion hardware. In accordance with one embodiment, each JBOD enclosure 208 may comprise a first input/output module 228a and a second input/output module 228b. Each input/output module 228 may include an input port 232 and an output port 236, also referred to as expanders.

An expander or expansion port 224 is used to connect the respective controller 612 of the head RAID enclosure 204 to a JBOD enclosure 208. The first expansion port 224a may be connected to the input port 232 of the first input/output module 228a in the first JBOD enclosure 208a via the expansion cabling 216. The second expansion port 224b may be connected to the input port 232 of the second input/output module 228b in the first JBOD enclosure 208a via the expansion cabling. If additional expansion is desired, then the output port 236 of the first input/output module 228a in the first JBOD enclosure 208a may be connected to the input port 232 of the first input/output module 228a if the second JBOD enclosure 208b. Likewise, the output port 236 of the second input/output module 228b in the first JBOD enclosure 208a may be connected to the input port 232 of the second input/output module 228b in the second JBOD enclosure 208b. This series of expansion may continue up until the Nth JBOD enclosure 208N.

The first JBOD enclosure 208a, which may have the first expander or input/output module 228a as seen by a controller in the RAID enclosure 204, may be assigned an enclosure ID equal to one. The assignment application 212 may continue to assign enclosure IDs incrementally in accordance with the cabling order. Assignment of enclosure IDs based on cabling order provides each enclosure 204, 208 a logical enclosure ID that can also be used to identify the location of the enclosure 204, 208.

Figure 3:
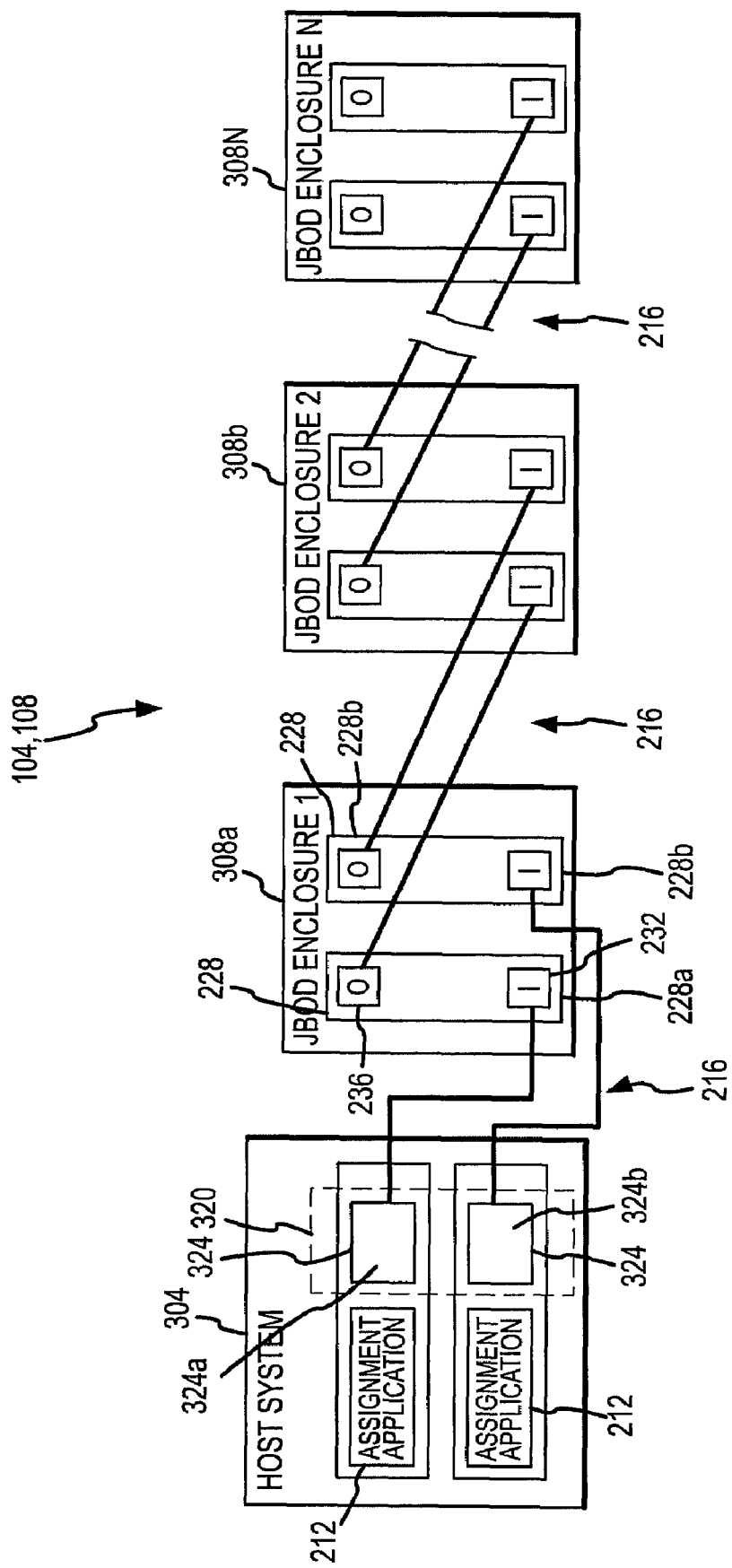
FIG. 3 is a block diagram depicting a data storage system having a JBOD enclosure as the head enclosure in accordance with embodiments of the present invention.

Referring now to FIG. 3, a data storage system 104, 108 having a JBOD enclosure 308a as the head enclosure in accordance with at least some embodiments of the present invention is illustrated. JBOD enclosures 208, 308 generally do not include controller functionality. Accordingly, JBOD enclosures 208, 308 do not have the capability to analyze an enclosure topology and determine a cabling order of enclosures. It follows that JBOD enclosures 208, 308 cannot typically assign enclosure IDs. Therefore, in a storage system 104, 108 exclusively comprising JBOD enclosures 308a-N a host system 304 employs an assignment application 212 to assign enclosures 308 an enclosure ID. A host system 304 may include a host computer 112, an administrative computer 116, or a similar device having a processor.

The host system 304 is connected to the JBOD enclosures 308a-N via expansion cabling 216. In accordance with one embodiment of the present invention, the host system 304 connects to the expansion cabling 216 through include an expansion channel 320 that includes one or more expansion ports 324. A first expansion port 324a may be associated with a first expansion controller while a second expansion portion 324b may be associated with a second expansion controller.

The JBOD enclosures 308a-N may also include expansion hardware. In accordance with one embodiment, each JBOD enclosure 308 may comprise expansion hardware similar to that of the JBOD enclosures 208a-N described above in connection with FIG. 2.

Each expansion port 324 of the host system 304 is used to connect the host system 304 to a JBOD enclosure 308. The first expansion portion 324a may be connected to the input port 232 of the first input/output module 228a in the first JBOD enclosure 308a via the expansion cabling 216. The second expansion port 224b may be connected to the input port 232 of the second input/output module 228b in the first JBOD enclosure 308a via the expansion cabling. If additional expansion is desired, then the output port 236 of the first input/output module 228a in the first JBOD enclosure 308a may be connected to the input port 232 of the first input/output module 228a in the second JBOD enclosure 308b. Likewise, the output port 236 of the second input/output module 228b in the first JBOD enclosure 308a may be connected to the input port 232 of the second input/output module 228b in the second JBOD enclosure 308b. This series of expansion may continue up until the Nth JBOD enclosure 308N. The cabling order of the JBOD enclosures 308a-N is typically defined relative to the host system 304. For example, the first JBOD enclosure 308a connected to the host system 304 is typically referred to as being first in the cabling order. The second JBOD enclosure 308b connected to the first JBOD enclosure 308a is usually defined as being second in the cabling order. Of course, the cabling order may be reversed relative to the host system 304 (i.e., the Nth JBOD enclosure 308N may be considered first in the cabling order and the first JBOD enclosure 308a may be considered last in the cabling order).

In one embodiment, the assignment application 212 is used to assign enclosure IDs to each JBOD enclosure 308a-N in the storage system 104, 108 based on the cabling order. In a preferred embodiment, the JBOD enclosures 308a-N are assigned enclosure IDs that incrementally ascend with the cabling order. In other words, the first JBOD enclosure 308a is assigned the lowest enclosure ID (e.g., zero), the second JBOD enclosure 308b is assigned the next lowest enclosure ID (e.g., one), and so on until all JBOD enclosures 308 have been assigned an enclosure ID. However, in an alternative embodiment, the JBOD enclosures 308a-N are assigned enclosure IDs that incrementally descend with the cabling order. Illustratively, the first JBOD enclosure 308a is assigned the highest enclosure ID (e.g., N−1), the second enclosure 308b is assigned the next highest enclosure ID (e.g., N−2), and so on until all JBOD enclosures 308 have a unique enclosure ID.

Figure 4:
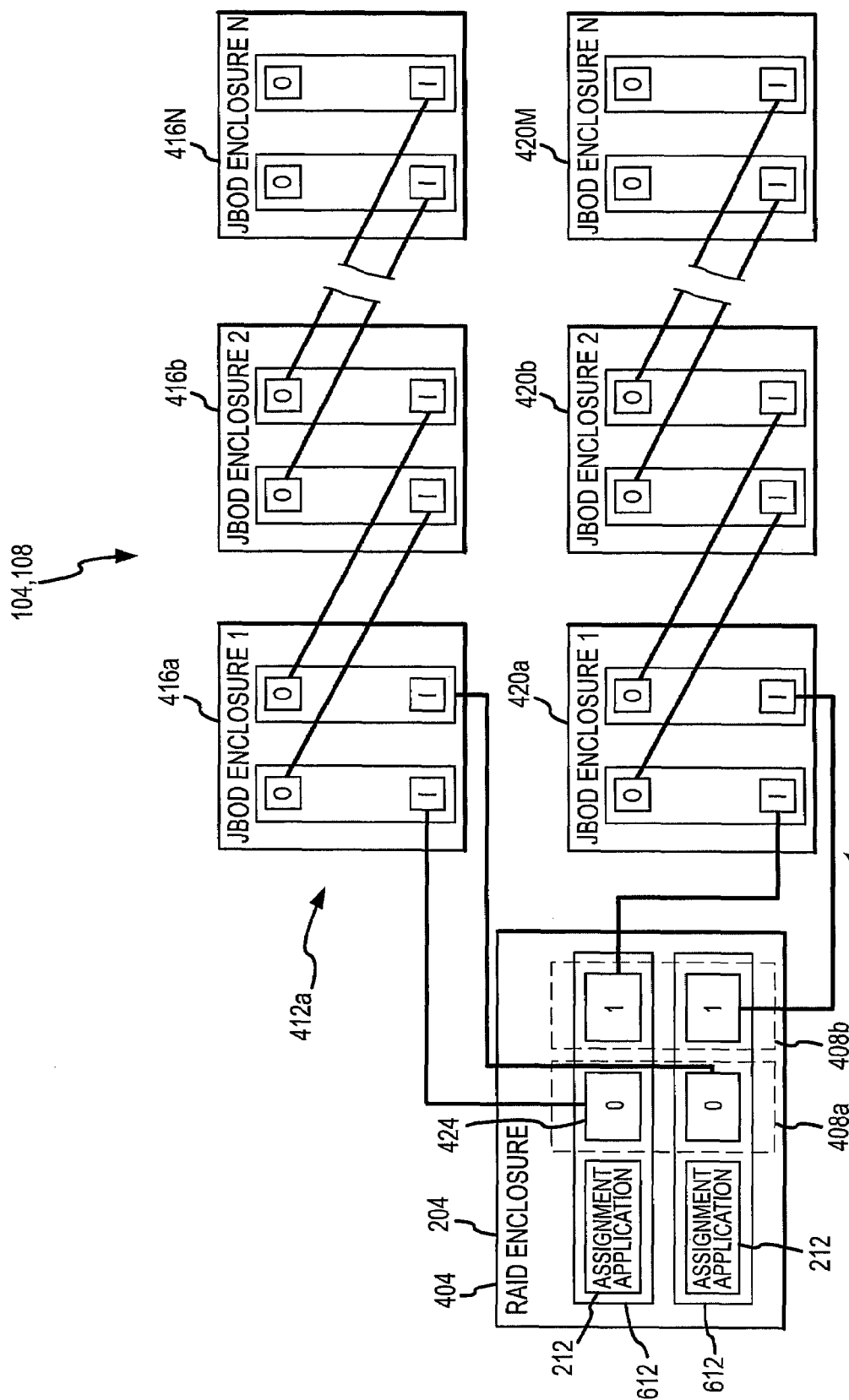
FIG. 4 is a block diagram depicting a data storage system having multiple domains of enclosures in accordance with embodiments of the present invention.

FIG. 4 depicts a data storage system 104, 108 having multiple domains 412 of JBOD enclosures 416, 420 in accordance with at least some embodiments of the present invention. In the multiple domain embodiment, a head end 404 (e.g., a RAID enclosure 204) comprises one or more expansion channels 408a and 408b that include expanders 424 from each controller 612 that connect to different domains 412 of JBOD enclosures 416a-N, 420a-M. A first expansion channel 408a may include expanders 424 from the first and second controller 612 for connecting to JBOD enclosures 416 in the first domain 412a. A second expansion channel 408b may include expanders 424 for connecting to JBOD enclosures 420 in the second domain 412b. The expansion hardware (i.e., expansion channels 408, expansion ports 424, input/output modules 228, input ports 232, and output ports 236) within the RAID enclosures and JBOD enclosures are essentially used to facilitate communication between large numbers of storage devices, which may be dispersed among a number of enclosures.

The assignment application 212 assigns unique enclosure IDs to each enclosure 204, 416, 420 in the storage system 104, 108. In one embodiment, the unique enclosure IDs are assigned based on the topology of the storage system 104, 108. For example, the RAID enclosure 204 may be assigned the lowest (or highest) enclosure ID. The next lowest (or highest) enclosure ID may be assigned to the first JBOD enclosure 416a in the first domain 412a. Thereafter, the next lowest (or highest) enclosure ID may be assigned to the second JBOD enclosure 416b in the first domain 412a. All enclosures 416 in the first domain 412a may be assigned enclosure IDs prior to the enclosures 420 in the second domain 412b receiving enclosure IDs. This particular pattern of assigning enclosure IDs is referred to as a depth first assignment methodology. In accordance with another embodiment of the present invention, a breadth first assignment methodology may be employed. In a breadth first assignment methodology, the RAID enclosure 204 may still be assigned the lowest (or highest) enclosure ID and the first JBOD enclosure 416a in the first domain 412a may still receive the next lowest (or highest) enclosure ID. However, the next lowest (or highest) enclosure ID may then be assigned to the first JBOD enclosure 420a in the second domain 412b. The assignment of enclosure IDs is then performed sequentially based on how close a particular JBOD enclosure 416, 420 is to the head end 404.

In still another embodiment, enclosure IDs may be generated to uniquely identify the JBOD enclosures 416, 420 residing in different domains. For instance, the enclosure IDs may be incrementally assigned to each enclosure 416, 420 based on the enclosure's proximity to the head end 404. The unique identifiers may be alphanumeric starting at a base identifier and incrementally increasing therefrom. As an example, unique numeric identifiers (e.g., 0, 1, 2, . . . , n) may be assigned.

As can be appreciated, a host system 304 may be employed to run the assignment application 212 instead of a RAID enclosure 204 depicted. The enclosure IDs assigned to each JBOD enclosure 416, 420 will vary depending upon whether a RAID enclosure 204 or host system 304 is utilized. For example, if a RAID enclosure 204 is used, then the RAID enclosure 204 will also need an enclosure ID assigned to it which will ultimately effect what enclosure IDs are assigned to the JBOD enclosures 416, 420. Alternatively, if a host system 304 is used, then the assignment application 212 will only need to assign enclosure IDs to the JBOD enclosures 416, 420.

It can be appreciated by one of skill in the art that a storage system 104, 108 may include zero, one, or multiple RAID enclosures 204. As noted above, a JBOD enclosure 304 may be used as a head enclosure. In other embodiments, a RAID enclosure 204 may be utilized as the head enclosure. Other RAID enclosures 204 may be connected to the head RAID enclosure 204, either directly or indirectly, although such a configuration is not necessary.

Figure 5:
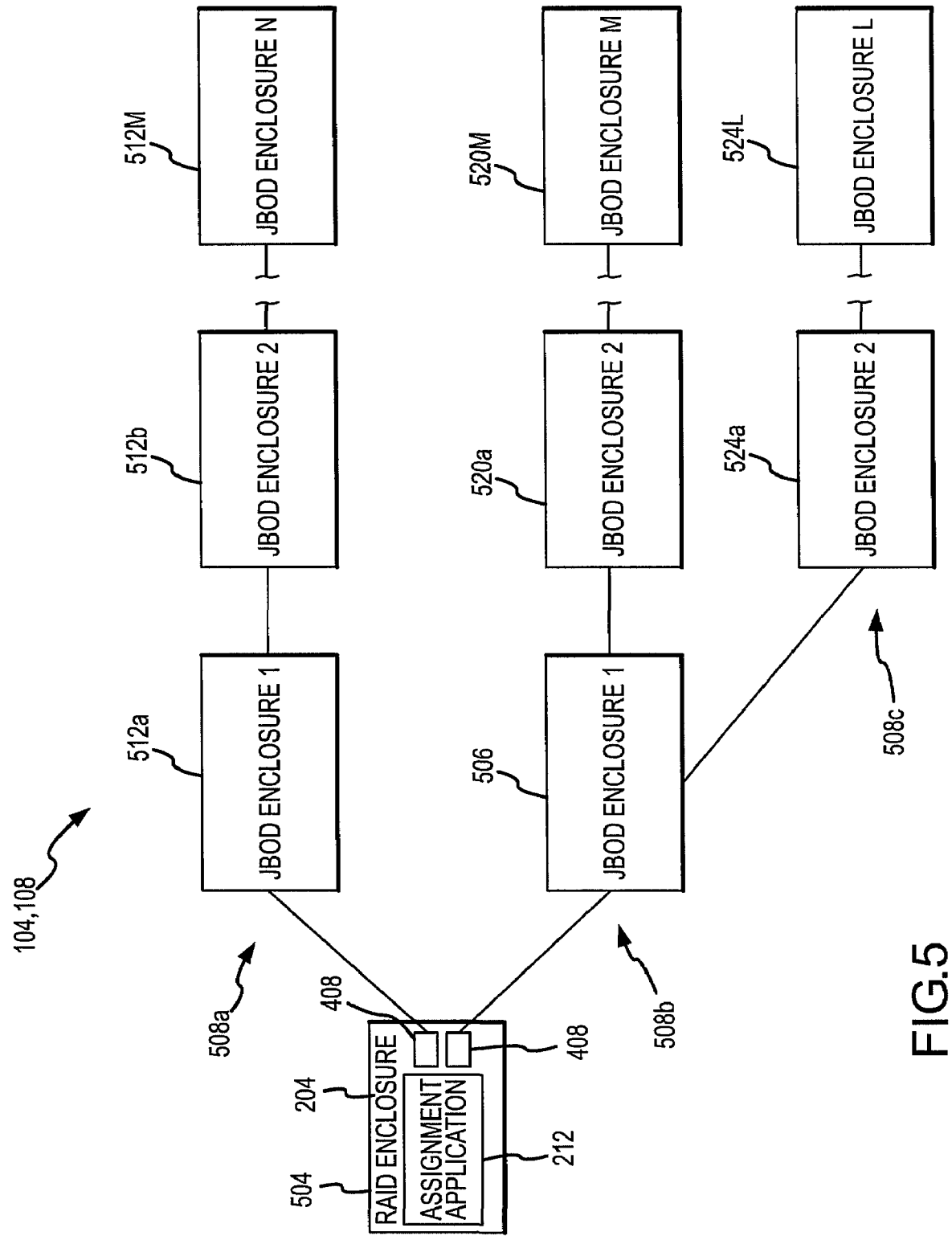
FIG. 5 is a block diagram depicting a data storage system having enclosures connected in a tree topology in accordance with embodiments of the present invention.

FIG. 5 depicts an extension of the multiple domain or tree topology data storage system 104, 108 in accordance with at least some embodiments of the present invention. A tree topology generally includes a number of different domains 508a-c connected to a head end 504 (e.g., a RAID enclosure 204 or host system 304). Some domains such as 508a and 508b may be connected directly to the head end 504 whereas other domains may be connected to the head end 504 through a splitting enclosure 516. Each domain may have a different number of JBOD enclosures. For example, the first domain 508a may include enclosures 508a-N, the second domain 508b may include enclosures 516 and 520a-M, and the third domain 508c may include enclosures 524a-L. Of course a greater or lesser number of domains may be included in the storage system 104, 108 and each domain may have one or more enclosures.

The assignment application 212 may assign enclosure IDs in either a breadth first or depth first fashion as described above. In an alternative embodiment, domain identifiers and enclosure identifiers may be combined to form the enclosure ID. The difference may occur with the assignment of enclosure IDs to splitting enclosures 516. The splitting enclosure 516 may be assigned to either the second domain 508b or the third domain 508c. Assignment of the splitting enclosure 516 to a domain can be arbitrary. However, the domain that the splitting enclosure 516 is assigned will affect the enclosure IDs assigned to subsequent enclosures connected to the splitting enclosure 516. For example, if the splitting enclosure 516 is assigned to the second domain 508b, then the splitting enclosure 516 may receive an enclosure ID of [2.0]. It follows that JBOD enclosure 520a will be assigned an enclosure ID of [2.1]. Also, the JBOD enclosure 524a will be assigned an enclosure ID of [3.0]. Alternatively, if the splitting enclosure 516 is assigned to the third domain 508c, then the splitting enclosure 516 may be assigned an enclosure ID of [3.0]. With the splitting enclosure 516 assigned to the third domain 508c the JBOD enclosure 520a will receive an enclosure ID of [2.0] since it is the first enclosure assigned an enclosure ID in the second domain 508b. The JBOD enclosure 524a will then be the second enclosure assigned an enclosure ID in the third domain 508c and will therefore likely receive an enclosure of [3.1].

Figure 6:
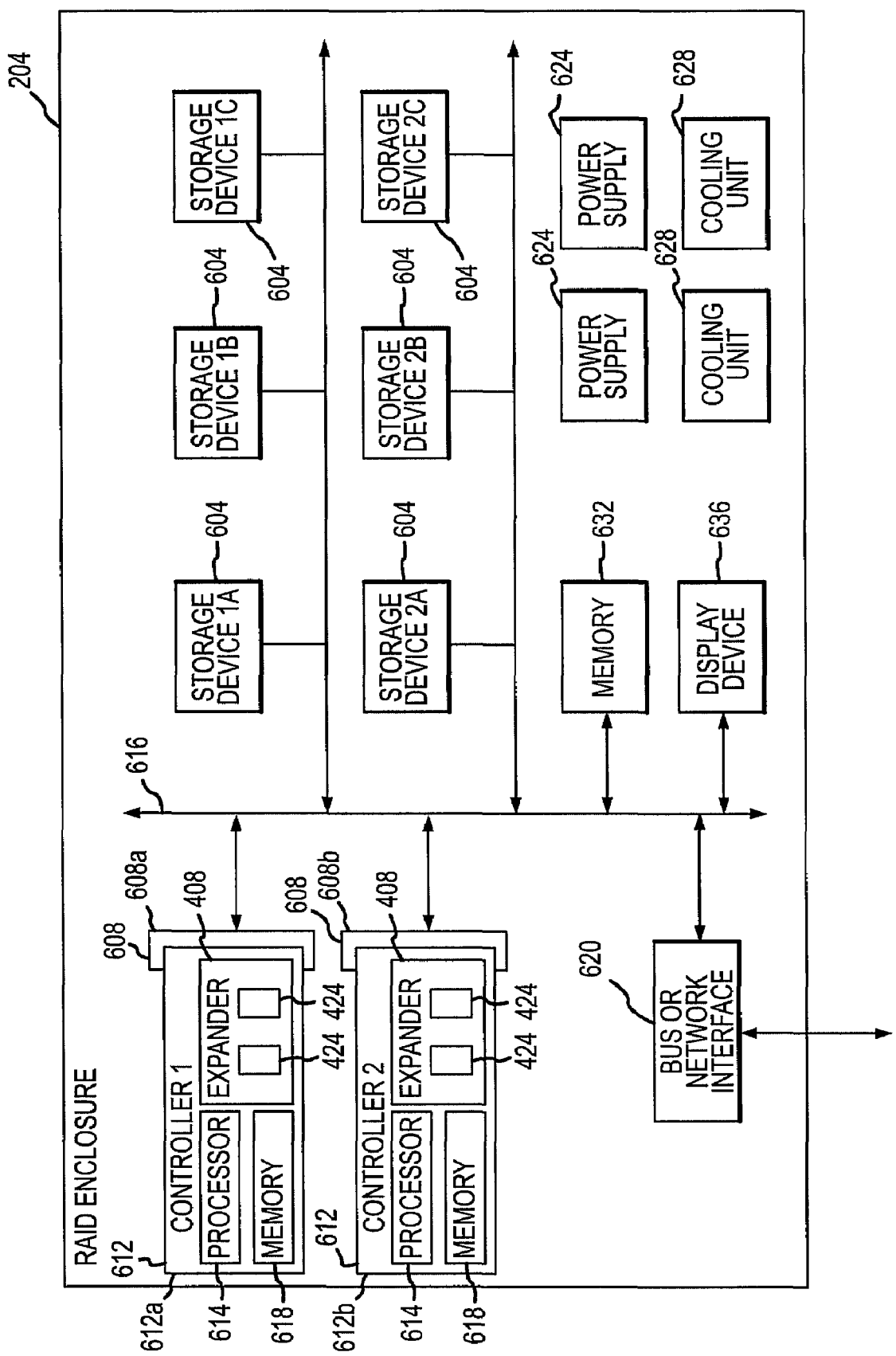
FIG. 6 is a block diagram depicting aspects of a RAID enclosure in accordance with embodiments of the present invention.

FIG. 6 illustrates components that may be included in a RAID enclosure 204 in accordance with embodiments of the present invention. The RAID enclosure 204 generally comprises one or more storage devices 604 and at least one controller 612 for directing the flow of data to the storage device(s) 604. The controller 612 of the RAID enclosure 204 may also include an assignment application 212 as shown in FIGS. 2, 4, and 5. The assignment application 212 is capable of assigning each enclosure 204, 208 an enclosure ID. In one embodiment, the assignment application 212 assigns enclosure IDs based upon the cabling order or topology of data storage system 104, 108.

In general, the RAID enclosure 204 includes a number of storage devices 604. Examples of storage devices 604 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 604 include magnetic tape storage devices, optical storage devices or solid-state disk devices. Furthermore, although a number of storage devices 604 are illustrated, it should be appreciated that embodiments of the present invention are not limited to any particular number of storage devices 604, and that a lesser or greater number of storage devices 604 may be provided as part of a RAID enclosure 204. In one embodiment, each storage device 604 within the RAID enclosure 204 is assigned a unique device identifier, which may be a combination of the enclosure ID and the device ID. As can be appreciated by one of skill in the art, one or more arrays and/or array partitions, hereinafter referred to as logical unit numbers (LUNs) comprising a storage volume, may be established on the data storage devices 604. As can be further appreciated by one of skill in the art, a LUN may be implemented in accordance with any one of the various array levels or other arrangements for storing data on one or more storage devices 604.

A RAID enclosure 204 in accordance with embodiments of the present invention may be provided with a first controller slot 608a. In addition, other embodiments may include additional controller slots, such as a second controller slot 608b. As can be appreciated by one of skill in the art, a controller slot 608 may comprise a connection or set of connections to enable a controller 612 to be operably interconnected to other components of the RAID enclosure 204. Furthermore, a RAID enclosure 204 in accordance with embodiments of the present invention includes at least one controller 612a. For example, while the RAID enclosure 204 is operated in a single controller, non-failover mode, the RAID enclosure 204 may include exactly one controller 612. A RAID enclosure 204 in accordance with other embodiments of the present invention may be operated in a dual redundant active-active controller mode by providing a second controller 612b. When a second controller 612b is used in addition to a first controller 612a, the second controller slot 608b receives the second controller. As can be appreciated by one of skill in the art, the provision of two controllers, 612a and 612b, permits data to be mirrored between the controllers 612a and 612b, providing redundant active-active controller operation.

One or more busses or channels 616 are generally provided to interconnect a controller or controllers 612 through the associated controller slot or slots 608 to the storage devices 604. The channels 616 are generally used to transfer user data to/from the storage devices 604. Furthermore, while illustrated as a single line used to transfer data, it can be appreciated that a number of dedicated buses or channels may be provided. For example, in SAS a point-to-point topology is used to transfer data. However, other types of data buses known in the art may be employed. Additional components that may be included in a RAID enclosure 204 include one or more power supplies 624 and one or more cooling units 628. In addition, a bus or network interface 620 may be provided to interconnect the RAID enclosure 204 to the host computer 112 or administrative computer 116.

As noted above, a RAID enclosure 204 may include one or more expanders 408 to facilitate communications with other enclosures in the data storage system 104, 108. The expanders 408 may be included as a part of one or both controllers 612 and/or the bus or network interface 620.

A storage controller 612, in accordance with embodiments of the present invention, may further include a processor subsystem 614 capable of executing instructions for performing, implementing and or controlling various controller 612 functions. Such instructions may include instructions for identifying a storage system 104, 108 topology or cabling order and assigning enclosure IDs based on the topology or cabling order. Furthermore, such instructions may be stored as software and/or firmware, for example in memory 618 provided as part of the controller 612. As can be appreciated by one of skill in the art, operations concerning the generation of parity data or other operations may be performed using one or more hardwired and or programmable logic circuits provided as part of the processor subsystem. Accordingly, the processor subsystem may be implemented as a number of discrete components, such as one or more programmable processors in combination with one or more logic circuits. Processor subsystem may also include or be implemented as one or more integrated devices or processors. For example a processor subsystem may comprise a complex programmable logic device (CPLD).

A RAID enclosure 204 also generally includes memory 632. The memory 632 is not specifically limited to memory of any particular type. For example, the memory 632 may comprise a solid-state memory device, or a number of solid-state memory devices. In addition, the memory 632 may include separate non-volatile memory and volatile memory portions. Examples of volatile memory include DRAM and SDRAM. Examples of non-volatile memory include, but are not limited to, compact flash or other standardized non-volatile memory devices. The memory 632 may be utilized to store instructions for execution by the storage controller 612 such as the assignment application 212. Additionally, the memory 632 may be used to store the enclosure ID assigned to the RAID enclosure 204 as well as additional enclosure IDs assigned to other enclosures in the storage system 104, 108.

In one embodiment, enclosure IDs may be required to persist across power cycle changes. Accordingly, after the assignment application 212 has assigned enclosure IDs to enclosures in the data storage system 104, 108, the enclosure ID assignments may be maintained in memory 632 where it is accessible to both controllers 612a and 612b. Alternatively, the enclosure ID assignments may be maintained in a flash memory within both of the controllers 612. Of course, in other embodiments, each enclosure within the data storage system 104, 108 keeps track of its own enclosure Ids. In one embodiment, the enclosure IDs may be stored on volatile memory.

Storing enclosure IDs on volatile memory would allow a system administrator to reset the enclosure IDs of the system by powering down the enclosures. Upon reboot, the assignment application 212 may identify the data storage system 104, 108 topology or chain order and reassign enclosure IDs in accordance with the new topology or chain order, which may or may not be different from the original topology or chain order.

A RAID enclosure 204 may also include a display device 636 for displaying the enclosure ID assigned to the RAID enclosure 204. In one embodiment, the display device 636 comprises an electronic display connected to the bus or channel 616. The enclosure ID assigned to the RAID enclosure 204 is communicated to the display device 636 either from a controller 612 or the memory 632 via the bus or channel 616 and automatically displayed on the display device 636. Examples of a suitable display device include, without limitation, an LED display, an LCD display, or the like. In one embodiment, the display device 636 comprises a double-digit seven-segment LED display located on an "ear" of the RAID enclosure 204 such that it can be viewed when the RAID enclosure 204 is mounted in a rack of similar devices. Placing the display device 636 in a conspicuous place on the enclosure allows for easy identification of the enclosure ID. If there is no enclosure ID currently assigned to the RAID enclosure 204, then the display device 636 may display nothing (e.g., the enclosure 204 may be turned off). Alternatively, the enclosure 204 may display a default value that is not normally used (e.g., 'F'), if the enclosure 204 has not yet been assigned an enclosure ID. The display device 636 may also be adapted to display the unique device identifiers for the storage devices 604 stored within the RAID enclosure 204. This would be useful for locating a faulty storage device.

As can be appreciated by one skilled in the art, the expanders 424 are connected to additional enclosures via expansion cabling such as the expansion cabling depicted in FIG. 2, for example. The data bus depicted 616 is generally used to transfer user data. It should also be noted that storage devices 604 are generally dual ported, although such an embodiment is not depicted. For instance, SAS storage devices 604 implicitly provide dual port capacity, whereas SATA storage devices 604 provide is via an active-active SATA mux chip.

Figure 7:
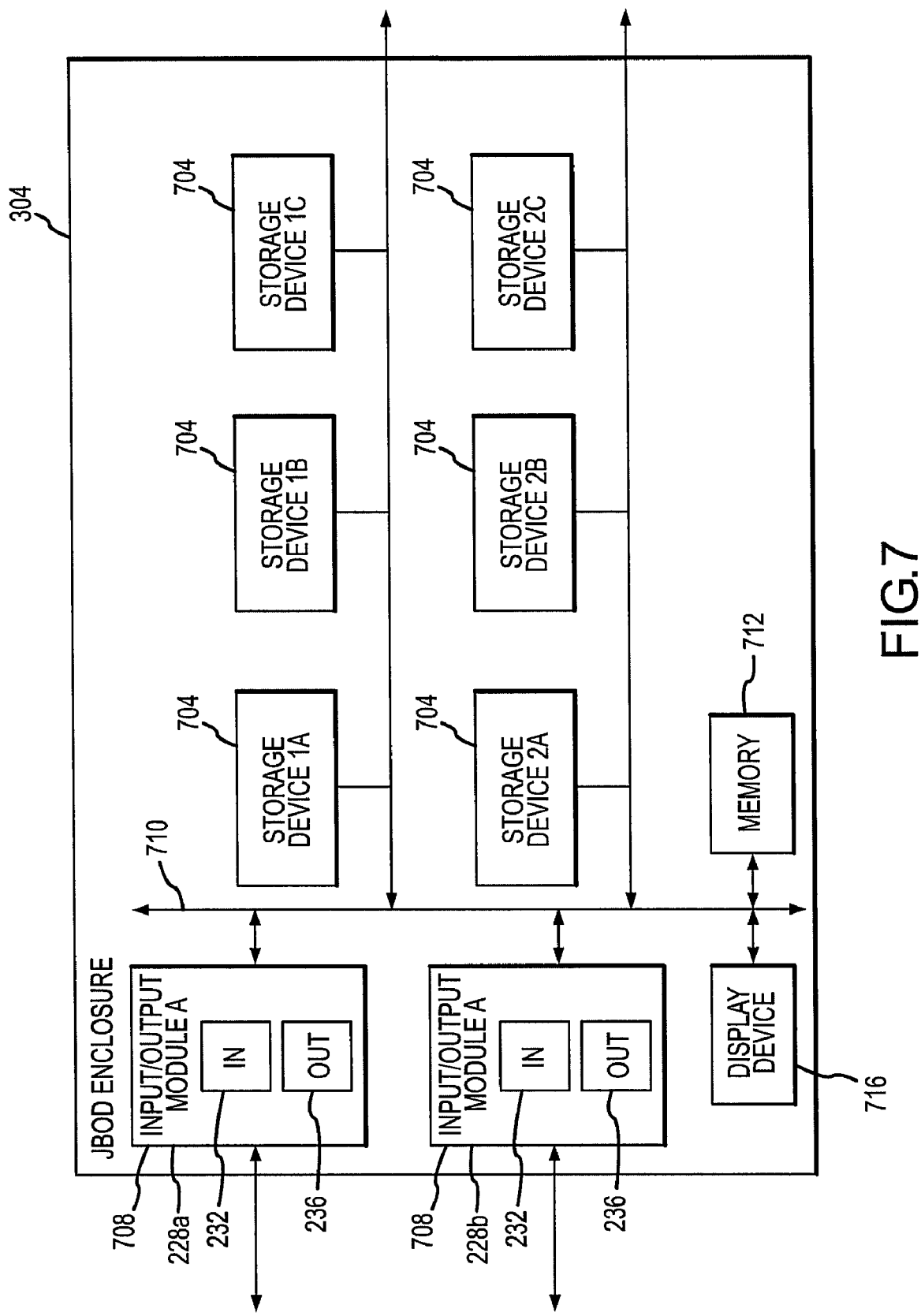
FIG. 7 is a block diagram depicting aspects of a JBOD enclosure in accordance with embodiments of the present invention.

FIG. 7 depicts an exemplary JBOD enclosure 304 in accordance with at least some embodiments of the present invention. A JBOD enclosure 304 typically includes storage device 704 similar to the storage devices 604 described in connection with the RAID enclosure 204. The JBOD enclosure 304 further includes a bus or network interface 708 for connecting with other enclosures within the data storage system 104, 108. The bus or network interface 708 includes one or more expanders 408 that provide the communication with other enclosures in the storage system 104, 108. The expanders 408 may also be used during the identification of the storage system 104, 108 topology or cabling order. One or more busses or channels 710 are generally provided to interconnect the bus or network interface 708 or expanders 408 to the storage devices 704.

In one embodiment, the JBOD enclosure 304 further includes a memory 712. The memory 712 may comprise volatile and/or non-volatile memory similar to the memory 632 of the RAID enclosure 204. The memory 712 is used to store the enclosure ID assigned to the JBOD enclosure 304. When the assignment application 212 assigns enclosure IDs to various JBOD enclosures 304, it may communicate those enclosure IDs to the enclosures. The enclosure IDs are received by the expanders 408 in the bus or network interface 708 and transferred via the bus 710 to the memory 712 for local storage.

A JBOD enclosure 304 may further include a display device 716 for displaying the enclosure ID and/or the unique storage device 704 IDs. The display device 716 is similar to the display device 636 of the RAID enclosure 204 in that it may receive the enclosure ID and display it automatically without requiring any user assistance.

Figure 8:
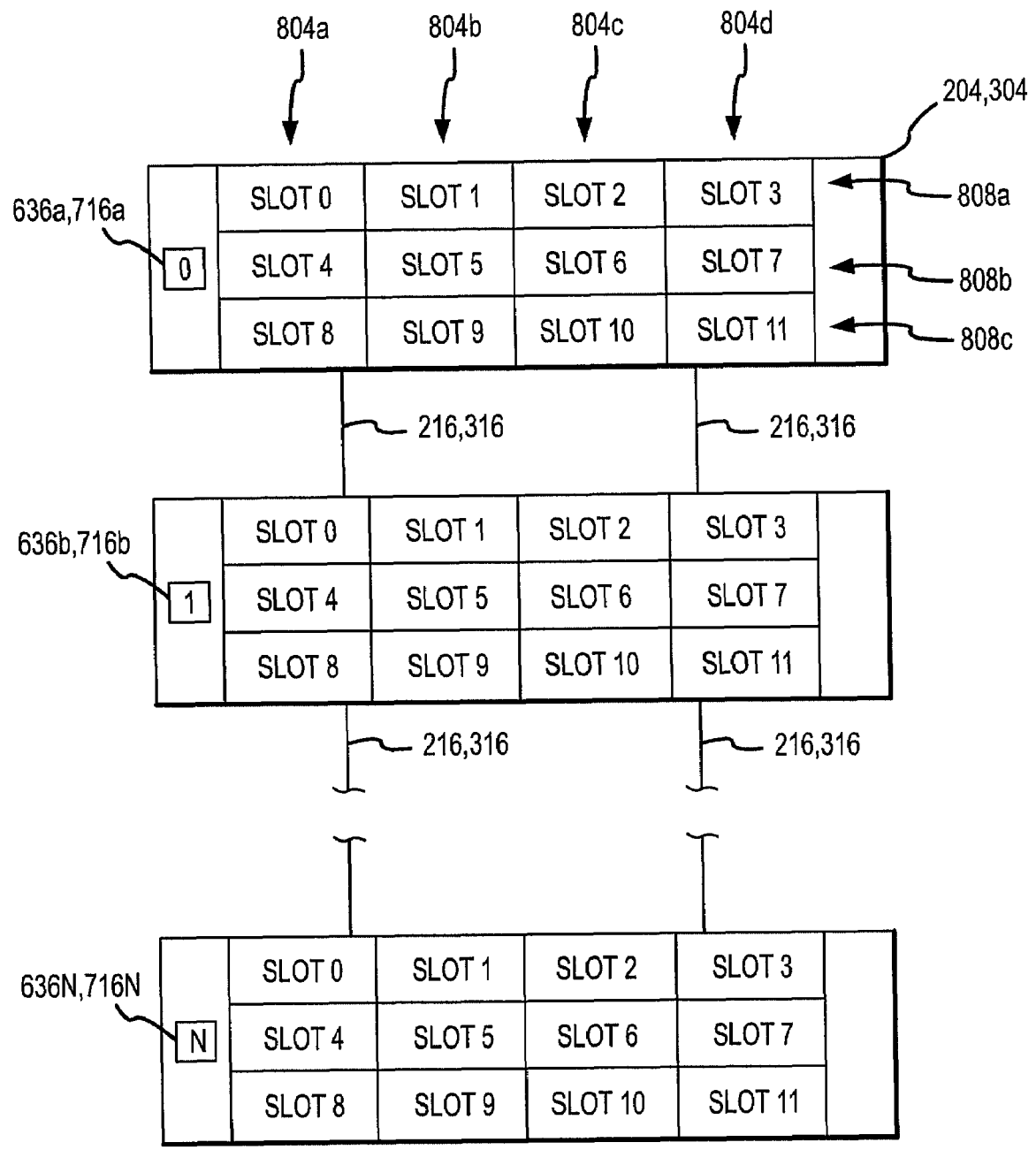
FIG. 8 is a block diagram depicting storage drive slots in a set of enclosures in accordance with embodiments of the present invention.

FIG. 8 depicts storage device 604, 704 drive slots in a set of enclosures 204, 304 in accordance with at least some embodiments of the present invention. Enclosures 204, 304 generally have storage devices 604, 704 stored in columns 804$a$-$d$ and rows 808$a$-$c$. A typical enclosure 204, 304 may be designed to hold twelve storage devices 604, 704 and therefore have four columns 804 and three rows 808. However, an enclosure 204, 304 may comprise a greater or lesser number of columns and/or rows than is depicted. Each storage device 604, 704 may be assigned a unique device ID. The unique device ID may correspond to the location of the slot within which the storage device 604, 704 is located as well as the enclosure ID of the enclosure 204, 204 in which the storage device 604, 704 resides. For example, a storage device 604, 704 located in slot 0 of the enclosure having an enclosure ID equal to 0 may receive a unique device ID of [0 . 00]. A storage device 604, 704 in the same slot location (i.e., slot 0) of the enclosure having an enclosure ID equal to 1 may receive a unique device ID of [1 . 00]. An example of the assigned unique device IDs assigned to all 36 storage devices 604, 704 using the [enclosure ID . slot number/device identifier] method is shown as follows:

[0.00]—head enclosure (enclosure ID=0). slot 0
[0.01]—head enclosure (enclosure ID=0). slot 1
[0.02]—head enclosure (enclosure ID=0). slot 2
[0.03]—head enclosure (enclosure ID=0). slot 3
[0.04]—head enclosure (enclosure ID=0). slot 4
[0.05]—head enclosure (enclosure ID=0). slot 5
[0.06]—head enclosure (enclosure ID=0). slot 6
[0.07]—head enclosure (enclosure ID=0). slot 7
[0.08]—head enclosure (enclosure ID=0). slot 8
[0.09]—head enclosure (enclosure ID=0). slot 9
[0.10]—head enclosure (enclosure ID=0). slot 10
[0.11]—head enclosure (enclosure ID=0). slot 11
[1.00]—second enclosure (enclosure ID=1). slot 0
[1.01]—second enclosure (enclosure ID=1). slot 1
[1.02]—second enclosure (enclosure ID=1). slot 2
[1.03]—second enclosure (enclosure ID=1). slot 3
[1.04]—second enclosure (enclosure ID=1). slot 4
[1.05]—second enclosure (enclosure ID=1). slot 5
[1.06]—second enclosure (enclosure ID=1). slot 6
[1.07]—second enclosure (enclosure ID=1). slot 7
[1.08]—second enclosure (enclosure ID=1). slot 8
[1.09]—second enclosure (enclosure ID=1). slot 9
[1.10]—second enclosure (enclosure ID=1). slot 10
[1.11]—second enclosure (enclosure ID=1). slot 11
[N .00]—Nth enclosure (enclosure ID=N). slot 0
[N .01]—Nth enclosure (enclosure ID=N). slot 1
[N .02]—Nth enclosure (enclosure ID=N). slot 2
[N .03]—Nth enclosure (enclosure ID=N). slot 3
[N .04]—Nth enclosure (enclosure ID=N). slot 4
[N .05]—Nth enclosure (enclosure ID=N). slot 5
[N .06]—Nth enclosure (enclosure ID=N). slot 6
[N .07]—Nth enclosure (enclosure ID=N). slot 7
[N .08]—Nth enclosure (enclosure ID=N). slot 8
[N .09]—Nth enclosure (enclosure ID=N). slot 9
[N .10]—Nth enclosure (enclosure ID=N). slot 10
[N .11]—Nth enclosure (enclosure ID=N). slot 11

Alternatively, the storage device 604, 704 may receive a device identifier corresponding to the column and row in which the storage device 604, 704 resides rather than a slot number. Of course, the unique device ID may also include a domain number if a multiple domain storage system 104, 108 topology is identified by the assignment application.

The display devices 636a-N, 716a-N are shown on each enclosure 204, 304 displaying the enclosure ID. As noted above, however, the display devices 636, 716 may also display the unique device IDs of each storage device 604, 704 mounted in the enclosure 204, 304. For example, the display device 636, 716 may include a number of LEDs arranged to represent the arrangement of slots on the enclosure and each slot may have a display to show the unique device ID of the storage device 604, 704 mounted in that slot.

Figure 9:
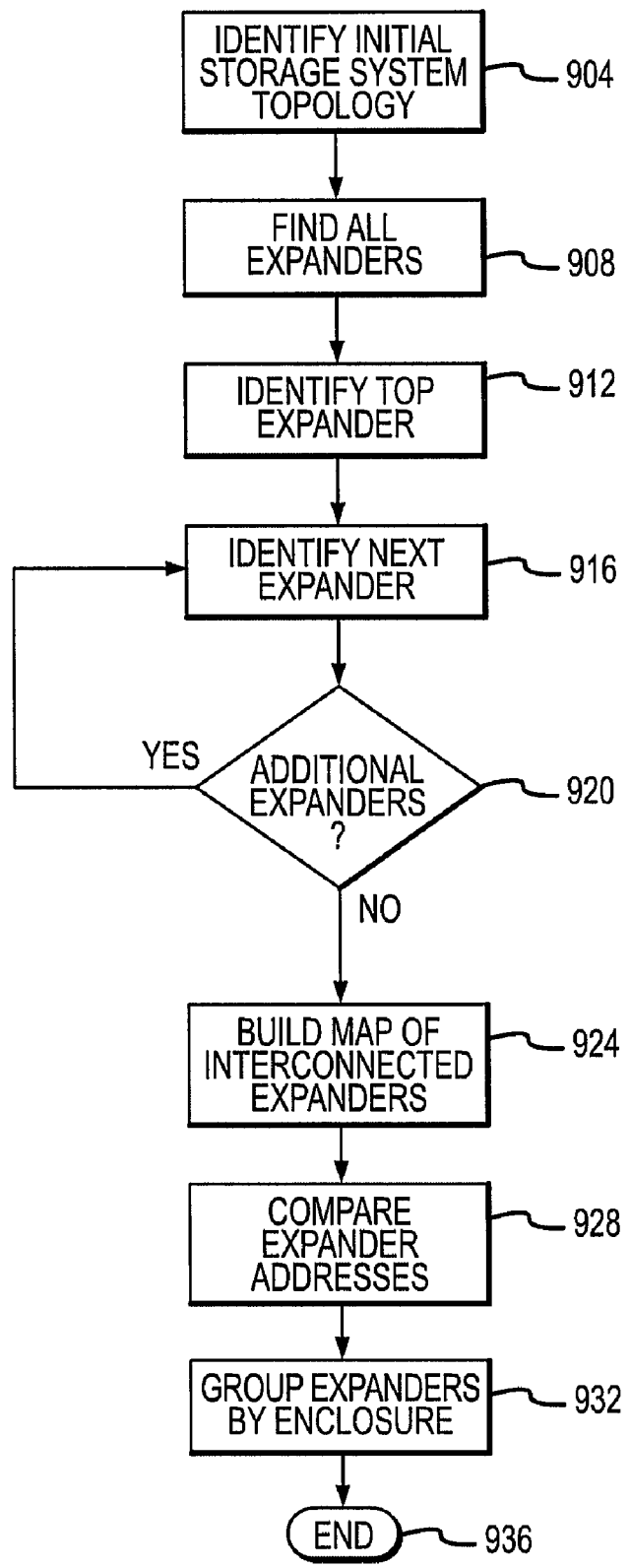
FIG. 9 is a flow chart depicting a method of identifying an initial data storage system topology in accordance with embodiments of the present invention.

Referring now to FIG. 9, a method of identifying an initial storage system 104, 108 topology or cabling order will be described in accordance with at least some embodiments of the present invention. The method begins when the decision is made to identify the storage system 104, 108 topology (step 904). The decision may be made as a result of powering up a device having the assignment application 212. Alternatively, the decision to identify the storage system 104, 108 topology may be made in reaction to receiving a command to identify the topology or whenever the topology of the system 104, 108 changes.

Once the decision is made to identify the storage system 104, 108 topology, the assignment application 212 will find all of the expanders 408 in the storage system 104, 108 (step 908). The assignment application 212 may be implemented in either a RAID enclosure 204 or in a host system 304. Each enclosure connected to another enclosure through the cabling 216 typically comprises at least one expander. If an enclosure is connected to two different enclosures, then two ports of one expander 408 may be used or two different expanders may be used. If more enclosures are connected to a single enclosure, then additional ports on an expander 408 or additional expanders may be employed. When all expanders 408 have been found the assignment application 212 has accounted for all enclosures within the storage system 104, 108.

With all enclosures accounted for, the assignment application 212 identifies the top expander 408 (step 912). The top expander 408 is the initiator-connected expander 408 that is used to send data to other enclosures within the storage system 104, 108. Thereafter, the assignment application will identify the next expander 408 in the cabling order by determining which expander 408 acts as a target for the top expander 408 (step 916). If an expander 408 acts as a target for the top (initiator) expander 408, then the assignment application 212 knows that the target expander 408 is directly connected to the top (initiator) expander 408 through cabling 216. Thereafter, the assignment application 212 determines if there are any additional expanders 408 within the storage system 104, 108 that have not been accounted for in the topology (step 920). If there are additional expanders 408, then the assignment application 212 will look at which expander 408 is acting as a target for the last identified expander 408 (step 916). The assignment application 212 will continue this process of identifying which expanders are connected through cabling 216 until there are no further expanders 408.

After all of the expanders 408 accounted for in step 908 have been identified in the cabling order, the assignment application builds a map of interconnected expanders 408, linked in software according to the expander's 408 physical connection (step 924). The map of interconnected expanders 408 identifies the location of each expander relative to the head enclosure, or more specifically the expander 408 within the head enclosure.

Once the map of interconnected expanders 408 has been generated, the assignment application 212 compares the addresses of each expander (step 928). In one embodiment the expanders are SAS expanders and therefore have SAS addresses. SAS addresses are World Wide Names (WWNs) generated based on the midplane of the enclosure in which they reside. Therefore, expanders associated with the same enclosure will generate almost identical addresses with the exception of a pre-determined A/B designator bit. Other than the designator bit, the addresses of expanders 408 in the same enclosure will be the same. Therefore, the assignment application 212 can group expanders 408 by enclosure by identifying expanders that have like addresses with the exception of their designator bit (step 932). When the expanders 408 have been grouped by enclosure, the assignment application 212 has successfully generated a map of the topology or cabling order of every enclosure in the storage system 104, 108 and the method ends (step 936).

Figure 10:
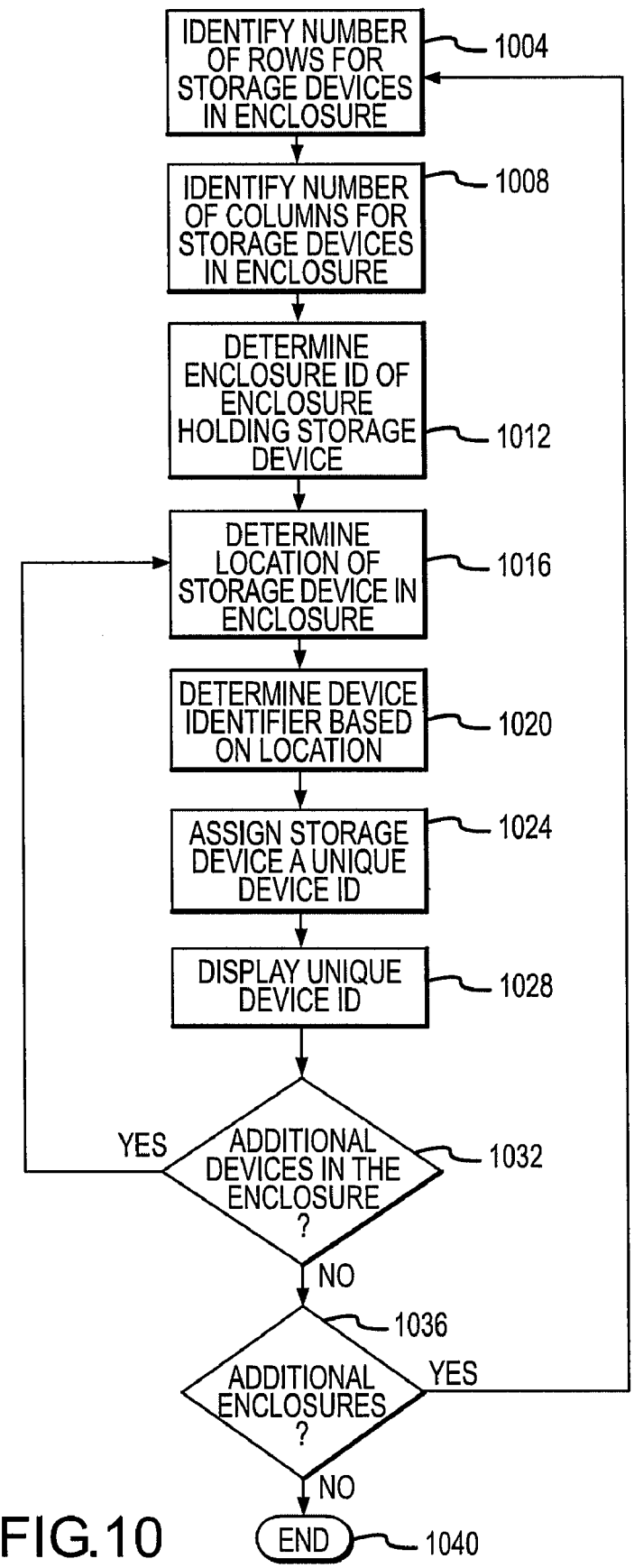
FIG. 10 is a flow chart depicting a method of assigning enclosure IDs to enclosures in a data storage system in accordance with embodiments of the present invention.

FIG. 10 depicts a method for numbering storage devices 604, 704 in accordance with at least some embodiments of the present invention. Initially, the number of rows for holding storage devices 604, 704 (i.e., storage device slots within an enclosure) is identified (step 1004). Thereafter, the number of columns for holding storage devices 604, 704 is identified (step 1008). The number of rows and columns may be a number stored in memory 632, 712. In another embodiment, a system administrator may be asked how many rows and columns of slots exist in an enclosure when the enclosure is being installed in the storage system 104, 108.

After the general layout of the enclosure is identified, the assignment application 212 determines the enclosure ID of the enclosure in which the storage device 604, 704 is situated (step 1012). The enclosure ID may be retrieved from memory 632, 712 upon request by the assignment application 212.

Once the enclosure ID is known, the assignment application 212 determines the location of the storage device 604, 704 within the enclosure (step 1016). In other words, the assignment application 212 identifies the row and column in which the storage device 604, 704 is located. Based on the location of the storage device 604, 704, the assignment application 212 determines a device identifier (step 1020). The device identifier uniquely identifies the location of the storage device 604, 704 within the enclosure. However, the device identifier does not typically uniquely identify the storage device 604, 704 throughout the entire storage system 104, 108. A storage device 604, 704 is usually not uniquely identified by its device identifier because there are often other enclosures within the storage system 104, 108 that have a similar layout. For example, there are usually multiple enclosures that have a storage device with a device identifier corresponding to a first row, first column within the enclosure. Therefore, an additional identifier needs to be added to the device identifier to uniquely identify the storage device 604, 704. A unique device ID is created by combining the enclosure ID and the device identifier in the unique device ID. Once a unique device ID is created it is assigned to the storage device 604, 704 (step 1024). The unique device ID uniquely identifies the storage device 604, 704 throughout the entire storage system 104, 108. Moreover, since the unique device ID is based on the location of the storage device 604, 704 within the enclosure as well as the enclosure's position within storage system 104, 108, the unique device ID can be used to quickly locate a storage device 604, 704.

After a unique device ID is assigned to a storage device 604, 704, the unique device ID is stored in memory either on the enclosure or in the storage device 604, 704 and displayed via the display device 636, 716 (step 1028). The display device 636, 716 for the enclosure may display the unique device IDs of each storage device 604, 704 associated therewith. The unique device IDs may be displayed proximate to each slot on the enclosure or may be displayed on the end of the enclosure. In an alternative embodiment, each storage device 604, 704 may be equipped with a display device that can display the assigned unique device ID.

When the unique device ID has been assigned to the storage device 604, 704, the assignment application 212 determines if there are any additional storage devices 604, 704 within the enclosure (step 1032). If there are more storage devices 604, 704 that have yet to receive a unique device ID, then the assignment application 212 determines the location of the next storage device 604, 704 (step 1016). On the other hand, if every storage device 604, 704 in the enclosure has received a unique device ID, then the assignment application 212 determines if there are any additional enclosures that have not had unique device IDs assigned to storage devices 604, 704 therein (step 1036). If there are additional enclosures in the storage system 104, 108 that have storage devices 604, 704 without unique device IDs, then the method returns to step 1204. Once all of the storage devices 604, 704 within the storage system 104, 108 have received a unique device ID, the method ends (step 1040).

In one embodiment, a storage device 604, 704 is not assigned a unique device ID until it is inserted into an enclosure. However, in other embodiments, storage slots in an enclosure may be assigned a unique device ID prior to receiving a storage device 604, 704. When a storage device 604, 704 is inserted into or received by a slot, the storage device 604, 704 may automatically assume the unique device ID associated with that slot. This helps ensure that IDs do not move around if a storage device 604, 704 is unplugged or plugged in to a new slot. In accordance with embodiments of the present invention, storage devices 604, 704 are assigned unique device IDs that are new to the storage device 604, 704 when that device is added to the enclosure in the appropriate slot having an ID assigned thereto. The assigned unique device ID is in most cases different from the WWN assigned to the storage device 604, 704 at manufacture.

Figure 11:
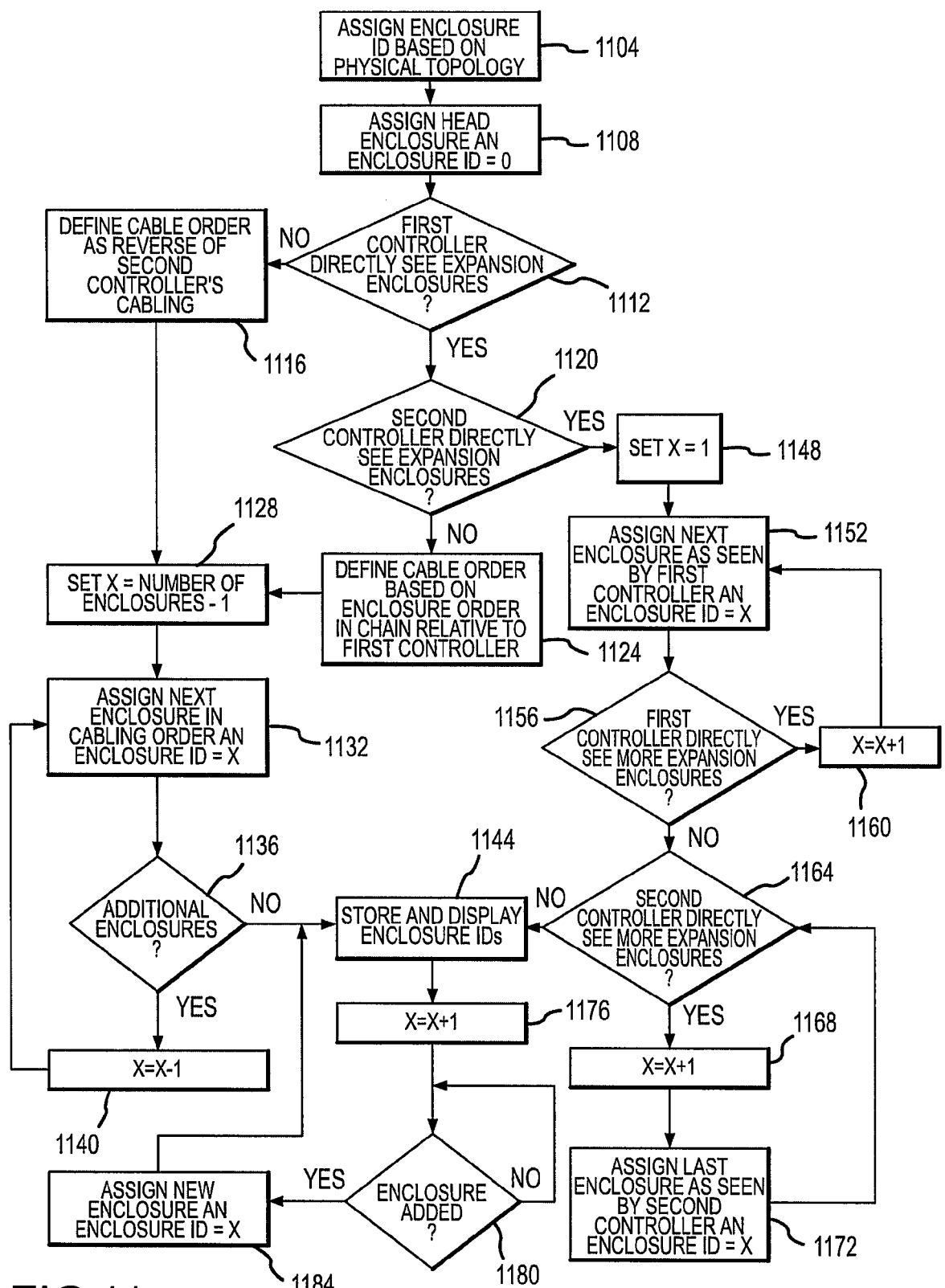
FIG. 11 is a flow chart depicting a method of assigning enclosure IDs based on the data storage system topology in accordance with embodiments of the present invention.

FIG. 11 depicts an alternative method of assigning enclosure IDs based on storage system 104, 108 topology or cabling order in accordance with at least some embodiments of the present invention. Initially, the method begins when the assignment application 212 decides to assign enclosure IDs to enclosures in the storage system 104, 108 (step 1104). Thereafter, the head enclosure is assigned an enclosure ID of zero (step 1108). In one embodiment, controllers 612 of a RAID enclosure 204 may be employed to assign enclosure IDs. Since controllers 612 may (and should) be cabled to enclosures differently to increase fault tolerance, the first controller's 612a cabling can then be used as the basis for assigning enclosure IDs. Assuming that a linear chain of cabling is used (i.e., there is no tree topology), if the first controller 612a is not installed, then the reverse of the second controller's 612b cabling order is used. This is because the first controller 612a and the second controller 612b should be cabled backwards from each other. When the first controller 612a is installed, the enclosure IDs stored on the second controller 612b can be shared with the first controller 612a in the boot handshake message. Therefore, after the head enclosure has received the enclosure ID of zero, it is determined whether the first controller 612a can directly see any expansion enclosures (step 1112). If the first controller 612a cannot directly see enclosures in the storage system 104, 108 (i.e., the first controller 612a is not installed), then the cabling order is defined as the reverse of the second controller's 612b cabling (step 1116). However, if the first controller 612a can directly see the expansion enclosures, then it is determined if the second controller 612b can directly see any expansion enclosures (step 1120). If the second controller 612b cannot directly see any expansion enclosures in the storage system 104, 108 (i.e., the second controller 612b is not installed), then the cabling order is defined based on the order in which enclosures are seen by the first controller 612a (step 1124). In other words, the enclosure that is directly connected to the first controller 612a is identified as first in the cabling order and each subsequent enclosure is ordered next in the cabling order.

In the event that only one controller 612 can see the topology of enclosures in the storage system 104, 108, then the cabling order is set based on that controller's 612 view of the enclosures of the storage system 104, 108. Once the cabling order is defined a variable X is set equal to the number of enclosures in the system 104, 108 minis one (step 1128). Thereafter, the next enclosure (based on the cabling order) that has not already been assigned an enclosure ID is assigned an enclosure ID equal to X (step 1132). Thereafter, the assignment application 212 determines if there are additional enclosures in the storage system 104, 108 that have not received an enclosure ID (step 1136). If there are additional enclosures, then the variable X is decremented (step 1140) and the method returns to step 1132. Once all of the enclosures have been assigned an enclosure ID the method continues by storing each enclosure ID either in memory on the controller 612 or in a separate memory 632, 712 and displaying the enclosure IDs on each enclosures display device 636, 716 (step 1144).

Reverting back to step 1120, if it is determined that both the first 612a and second 612b controllers can see expansion enclosures, then the method continues by setting the variable equal to X (step 1148). Thereafter, the assignment application 212 assigns the next enclosure as seen by the first controller 612a an enclosure ID equal to X (step 1152). Once the first enclosure as seen by the first controller 612a has been assigned an enclosure ID, it is determined if there are any additional enclosures that can be seen by the first controller 612a (step 1156). If there are additional enclosures viewable by the first controller 612a, then the assignment application 212 continues by incrementing the variable X (step 1160) and returning to step 1152.

However, when there are no additional enclosures viewable by the first controller 612a, it is determined if the second controller 612b can see any more enclosures that still have yet to be assigned an enclosure ID (step 1164). If there exists an enclosure that has not been assigned an enclosure ID, because it was not viewable by the first controller 612a, then the assignment application increments the variable X (step 1168). Thereafter, the assignment application 212 assigns the last enclosure (not having an enclosure ID) as seen by the second controller 612b an enclosure ID equal to X (step 1172). When the enclosure ID is assigned to the last enclosure as seen by the second controller 612b, the method returns to step 1164. After all of the enclosures have been assigned an enclosure ID, the method continues to step 1144.

After the enclosure IDs have been stored and displayed, the assignment application 212 increments the variable X once again in anticipation of the addition of more enclosures to the storage system 104, 108 (step 1176). After the variable X has been incremented, the assignment application 212 will wait until a new enclosure is detected in the storage system 104,

108 (step 1180). When an enclosure is added to the chain after the topology has been detected and enclosure IDs assigned, the new enclosure is assigned an enclosure ID equal to X (step 1184). Once the new enclosure has been assigned an enclosure ID, the method returns to step 1144.

If persistence is required, then enclosure IDs are maintained until both controllers 612 are rebooted. Alternatively, if enclosure IDs are stored in memory, persistence is maintained until the memory is cleared. In an alternative embodiment, if persistence of enclosure IDs is not required, then all enclosure IDs are re-evaluated when a new enclosure is added. More specifically, if the new enclosure causes a topology change event on both controllers 612 at about the same time, then the expanders are rediscovered and a new topology map is generated.

Humans tend to expect things to follow a natural order, and if enclosures are placed in a rack in order, then it would be natural to expect that enclosure IDs would be assigned in the same order. Therefore, an advantage of this embodiment is that the enclosure ID assignment method described in connection with FIG. 11 uses physical cabling as the basis for assigning enclosure IDs.

Figure 12:
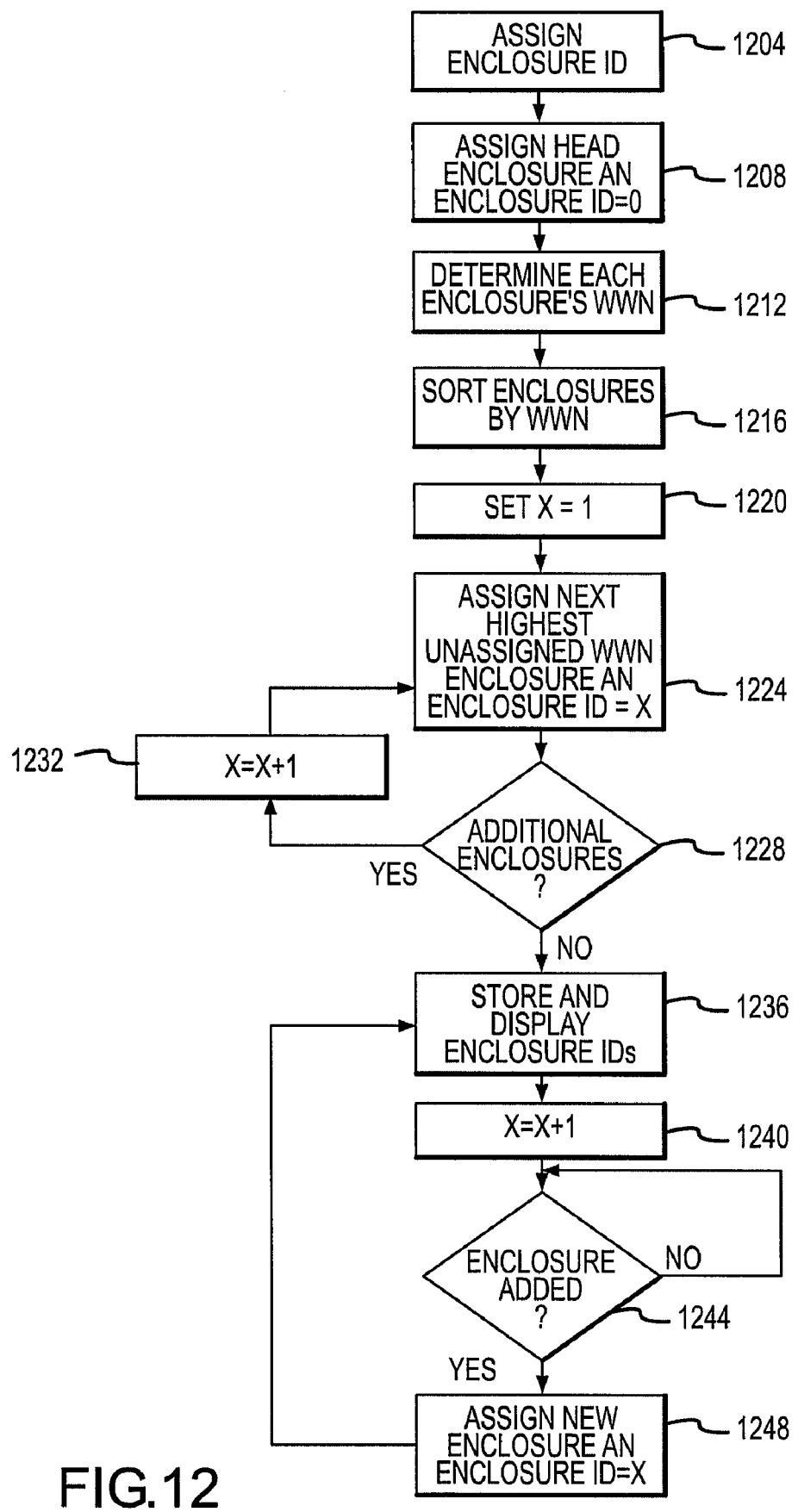
FIG. 12 is a flow chart depicting a method of assigning unique device IDs in accordance with embodiments of the present invention.

FIG. 12 depicts one method of assigning enclosure IDs in accordance with at least some embodiments of the present invention. The method is initiated when the assignment application 212 determines to assign enclosure IDs (step 1204). The assignment application 212 may make such a determination in response to receiving a command to assign enclosure IDs from a system administrator. Alternatively, if the enclosure IDs are not persistent, the assignment application 212 may automatically begin assigning enclosure IDs after the power to the storage system 104, 108 has been cycled. In one embodiment, the assignment application 212 begins by assigning the head enclosure (e.g., RAID enclosure 204 or JBOD enclosure 308a) an enclosure ID of zero (step 1208). After the head enclosure has been assigned its enclosure ID, the assignment application will identify each enclosure's WWN (step 1212). As previously noted, an enclosure contains one or more expanders 408 with an address that primarily represents the enclosure in which it resides with the exception of a designator bit. Therefore, the WWN of an enclosure is set equal to the addresses of expanders 408 within the enclosure less the addresses designator bit.

Thereafter, the assignment application 212 sorts enclosures by WWN (step 1216). The WWNs may be sorted in either ascending or descending order. In one embodiment, the enclosures are sorted based on the WWNs from lowest to highest. After sorting the enclosures, a variable X is set equal to one (step 1220). With the variable X initialized, the assignment application assigns the unassigned enclosure with the next highest WWN an enclosure ID equal to X (step 1224). Once that enclosure has been assigned an enclosure ID, the assignment application determines if additional enclosures exist in the storage system 104, 108 that have not been assigned an enclosure ID (step 1228). If there are still enclosures without an enclosure ID, then the method continues by incrementing X by one (step 1232) and returning to step 1224.

Subsequent to assigning each enclosure an enclosure ID, the enclosure IDs are stored in memory 632, 712 and/or displayed via the display device 636, 716 (step 1236). In one embodiment, each enclosure is equipped with a display device 636, 716 and therefore displays its assigned enclosure ID. Similarly, each enclosure generally has its own memory for storing its assigned enclosure ID. Alternatively, the enclosure IDs may be stored at a single point and communicated to all enclosures within the storage system 104, 108.

In one embodiment, a RAID enclosure 204 comprising two controllers 612a and 612b are used to assign enclosure IDs. In this particular embodiment, the enclosure IDs are persistent (i.e., stored in memory 632, 712 or a local memory of the controller 612) until both controllers 612a and 612b are rebooted. Otherwise, the enclosure IDs are maintained and associated with the same enclosure to which they were originally assigned.

With the enclosure IDs stored and displayed on each enclosure, the assignment application again increments the variable X (step 1240). Thereafter, the assignment application 212 waits until another enclosure is added to the storage system 104, 108 (step 1244). Often times an added enclosure will have a WWN that lies between WWNs of already connected enclosures. If WWNs were simply re-sorted at this point, unique device IDs (which depend upon their enclosure ID) would be shifted up. This is undesirable because in-flight I/Os to these storage devices 604, 704 may end up at the wrong drive unless special handling occurs. Therefore, to avoid shifting unique device IDs, a list of known enclosure WWNs may be maintained and the assignment application 212 will not reassign enclosure IDs to enclosures already having an enclosure ID. As soon as a new enclosure is detected and its WWN determined, the WWN will be added to the list of known enclosure WWNs so that it will be preserved when another enclosure is added. Hence, a new enclosure ID will simply be assigned an enclosure ID equal to X, which is the lowest unused enclosure ID (step 1248).

As can be appreciated by one of skill in the art, the assignment of enclosure IDs does not necessarily need to be done in ascending order. Rather, enclosure IDs may be assigned in descending order starting from a randomly selected number. When an enclosure ID of zero is reached, subsequent enclosures may be assigned negative enclosure IDs, for example. Additionally, even if enclosure IDs are assigned in ascending order, the head enclosure does not necessarily need to be assigned an enclosure ID of zero. The assignment of enclosure IDs may begin from any randomly selected number or character.

In embodiments where a RAID enclosure 204 is used to assign enclosure IDs, there may be times when a controller 612 will need to be replaced. If the enclosure IDs or WWNs of enclosures within the storage system are maintained on a portion of memory of the controller 612, the new controller 612 will not be aware of the existing enclosure ID assignments. Therefore, enclosure ID assignments can be shared between enclosures as part of the boot handshake routine, from the already booted controller 612.

In one embodiment, the ability of a user to override the enclosure ID assignments chosen by the assignment application 212 may be made available. Such a feature may be useful especially where enclosure ID assignments have no physical cabling basis. The user override program should be able to change enclosure IDs in such a way that data loss or corruption is not allowed. Restricting enclosure ID reassignment to times where no I/O is flowing through the enclosures can achieve this goal. One way to stop I/O on both controllers 612 is to implement an I/O pause function that temporarily stops the I/O to the storage system 104, 108.

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A method of identifying storage system enclosures, comprising: identifying a topology of enclosures within the storage system by performing the following:
    determining whether a first controller is connected to at least one enclosure in the storage system;
    in the event that the first controller is connected to at least one enclosure, defining the cable order of the enclosures based on the chain of enclosures as connected to the first controller;
    in the event that the first controller is not connected to at least one enclosure, defining the cable order of the enclosures based on the reverse of its chain of enclosures as connected to a second controller;
    generating unique enclosure identifiers (IDs) in ascending order based on the defined cable order; and
    assigning enclosures in the storage system a unique enclosure ID based on the identified topology of enclosures within the storage system and the defined cable order.

2. The method of claim 1, further comprising storing the enclosure IDs on at least some of the enclosures in the storage system.

3. The method of claim 1, further comprising displaying the enclosure IDs on the enclosures.

4. The method of claim 1, wherein identifying a topology comprises: searching for all expanders in the storage system;
    identifying a top expander;
    identifying expanders that are below the top expander; and
    building a map of interconnected expanders that represents the physical interconnection of enclosures in the storage system.

5. The method of claim 4, further comprising:
    comparing expander addresses to determine which expanders are associated with a common enclosure; and
    logically grouping the expanders associated with a common enclosure.

6. The method of claim 1, further comprising:
    identifying a head enclosure;
    assigning the head enclosure a first enclosure ID;
    identifying a first enclosure that is connected to the head enclosure; and
    assigning the first enclosure a second enclosure ID.

7. The method of claim 6, wherein the head enclosure comprises a controller for executing commands received from a host and wherein the first enclosure comprises a first expander directly viewable by said first controller.

8. The method of claim 1, wherein the topology of the storage system is based on a physical cable connection order between enclosures.

9. The method of claim 1, further comprising assigning each storage device within an enclosure a unique device ID that comprises at least one of an enclosure ID and a device ID.

10. A device for assigning enclosures in a storage system identification numbers, comprising:
    a memory comprising an assignment application, wherein the assignment application contains instructions to:
        search for all expanders in the storage system;
        identify a top expander;
        identify expanders that are below the top expander;
        build a map of interconnected expanders that represents the physical interconnection of enclosures in the storage system;
        compare expander addresses to determine which expanders are associated with a common enclosure;
        logically group the expanders associated with a common enclosure;
        determining whether a first controller is connected to at least one enclosure in the storage system;
        in the event that the first controller is connected to at least one enclosure, defining the cable order of the enclosures based on the chain of enclosures as connected to the first controller;
        in the event that the first controller is not connected to at least one enclosure, defining the cable order of the enclosures based on the reverse of its chain of enclosures as connected to a second controller;
        generate a map of enclosures within the storage system based on the interconnection of the enclosures and grouping of expanders;
        assign each enclosure a unique enclosure identifier (ID) based on the enclosure's position within the storage system; and
    a processor operable to execute the assignment application instructions.

11. The device of claim 10, wherein the memory and processor are operatively associated with at least one of a controller located on a storage enclosure and a host computer.

12. The device of claim 10, wherein one or more of the enclosures in the storage system comprise a display device for displaying the enclosure's unique enclosure ID.

13. The device of claim 10, wherein the enclosures communicate with one another using a known storage system communications protocol that comprises one of Fibre Channel protocol and Serial Attached Small Computer Systems Interface (SAS).

14. The device of claim 10, wherein the assignment application further comprises instructions for uniquely identifying each storage device in each enclosure in the storage system and assigning each storage device a device ID.

15. The device of claim 14, wherein the device ID is a unique device ID that comprises the enclosure ID of the enclosure associated with the storage device as well as an identifier related to the location of the storage device in the enclosure.

16. An electronic data system including a number of enclosures, each enclosure containing one or more data storage devices, the system comprising:
    means for determining a forward and reverse cable order of the enclosures relative to a head enclosure;
        wherein a forward cabling order is determined in the event that a first controller is connected to at least one enclosure; and
        a reverse cable order is determined in the event that a first controller is not connected to at least one enclosure;
    means for generating enclosure identifiers (IDs); and
    means for assigning each enclosure in the system a different enclosure ID based on the enclosure's location in the cabling order, wherein the determination of enclosure IDs are made by the forward and reverse cable orders, and wherein the forward cable order is reversed from the reverse cable order relative to the head enclosure.

17. The system of claim 16, wherein the head enclosure comprises one of a RAID enclosure and a JBOD enclosure.

18. The system of claim 16, wherein the head enclosure is assigned the lowest generated enclosure ID and each subsequent enclosure in the cabling order is assigned an enclosure ID in ascending order, and wherein the forward cable order organizes enclosure IDs in ascending order and the reverse cable order organizes enclosure IDs in descending order.

19. The system of claim 16, wherein each enclosure comprises a means for displaying its respective enclosure ID.

20. The system of claim 16, wherein the means for assigning each enclosure in the system a different enclosure ID is further operable to sort enclosures by their respective World Wide Name (WWN), order enclosures based on their WWN, and assign enclosure IDs according to the WWN-based ordering of enclosures.

* * * * *